(12) United States Patent
Kruglick (10) Patent No.: US 9,811,526 B2
(45) Date of Patent: Nov. 7, 2017

(54) COMPUTING RESOURCE PROVISIONING BASED ON DEDUPLICATION

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 381 days.

(21) Appl. No.: 14/372,407

(22) PCT Filed: Dec. 2, 2013

(86) PCT No.: PCT/US2013/072633
§ 371 (c)(1),
(2) Date: Jul. 15, 2014

(87) PCT Pub. No.: WO2015/084308
PCT Pub. Date: Jun. 11, 2015

(65) Prior Publication Data
US 2015/0154219 A1   Jun. 4, 2015

(51) Int. Cl.
*G06F 17/30* (2006.01)
*G06F 9/455* (2006.01)
*G06F 9/50* (2006.01)

(52) U.S. Cl.
CPC .... *G06F 17/30156* (2013.01); *G06F 9/45558* (2013.01); *G06F 9/5072* (2013.01); *G06F 2009/4557* (2013.01)

(58) Field of Classification Search
CPC ......... G06F 2009/4557; G06F 9/45558; G06F 17/30156; G06F 9/5072
See application file for complete search history.

(56) References Cited

U.S. PATENT DOCUMENTS

| | | |
|---|---|---|
| 8,412,848 B2 | 4/2013 | Therrien et al. |
| 8,442,955 B2 | 5/2013 | Al Kiswany et al. |

(Continued)

FOREIGN PATENT DOCUMENTS

WO    2013085511 A1    6/2013

OTHER PUBLICATIONS

"BitNami: Applications," Accessed at http://web.archive.org/web/20131112071512/http://bitnami.com/stacks/, Accessed on Jul. 9, 2014, pp. 18.

(Continued)

*Primary Examiner* — Shiow-Jy Fan
(74) *Attorney, Agent, or Firm* — Moritt Hock & Hamroff LLP; Steven S. Rubin, Esq.

(57) ABSTRACT

Technologies are generally described for systems, devices and methods effective to provision computing resources based on deduplication. In an example, a resource cost may be produced. The resource cost may relate to execution of a first virtual machine at a data center. A processor may receive a first representation related to an image of the first virtual machine. The processor may receive a second representation related to one or more instances of second virtual machines being executed by the data center. The processor may compare the first and second representations to produce a deduplication value for the first virtual machine. The processor may transform the deduplication value to produce the resource cost.

20 Claims, 6 Drawing Sheets

(56) References Cited

U.S. PATENT DOCUMENTS

| | | | |
|---|---|---|---|
| 2006/0155674 A1 | 7/2006 | Traut et al. | |
| 2010/0070514 A1 | 3/2010 | Woodruff | |
| 2010/0138827 A1* | 6/2010 | Frank | G06F 9/45558 718/1 |
| 2011/0083131 A1* | 4/2011 | Pirzada | G06F 9/45533 718/1 |
| 2011/0225277 A1 | 9/2011 | Freimuth et al. | |
| 2012/0084414 A1 | 4/2012 | Brock et al. | |
| 2012/0124012 A1* | 5/2012 | Provenzano | G06F 17/30162 707/692 |
| 2012/0124014 A1* | 5/2012 | Provenzano | G06F 17/30156 707/692 |
| 2013/0036100 A1* | 2/2013 | Nagpal | G06F 17/30156 707/692 |
| 2013/0080405 A1* | 3/2013 | Smith | G06F 17/30159 707/692 |
| 2013/0138812 A1 | 5/2013 | Assuncao et al. | |
| 2013/0144846 A1* | 6/2013 | Chhaunker | G06F 17/30194 707/692 |
| 2013/0185729 A1* | 7/2013 | Vasic | G06F 9/5072 718/104 |
| 2013/0290274 A1* | 10/2013 | Patil | G06F 17/30156 707/690 |
| 2013/0290538 A1 | 10/2013 | Gmach et al. | |
| 2013/0304903 A1* | 11/2013 | Mick | H04L 43/0817 709/224 |
| 2014/0052698 A1* | 2/2014 | Chen | G06F 9/45558 707/692 |
| 2014/0365607 A1* | 12/2014 | Kikuchi | H04L 67/10 709/217 |

OTHER PUBLICATIONS

"Data deduplication," Accessed at http://web.archive.org/web/20131128205123/http://en.wikipedia.org/wiki/Data_deduplication, Accessed on Jul. 8, 2014, pp. 8.

"Linux 2.6.32," released on Dec. 3, 2009, Accessed at http://web.archive.org/web/20131127135407/http://kernelnewbies.org/Linux_2_6_32, Accessed on Jul. 8, 2014, pp. 14.

"Open source software for building private and public clouds," Accessed at http://web.archive.org/web/20131201062336/http://www.openstack.org/, Accessed on Jul. 8, 2014, pp. 3.

"Red Hat Announces Preview Version of Enterprise-Ready OpenStack Distribution," on Aug. 13, 2012, Accessed at http://web.archive.org/web/20131001144041/http://www.redhat.com/about/news/press-archive/2012/8/red-hat-announces-preview-version-of-enterprise-ready-openstack-distribution, Accessed on Jul. 9, 2014, pp. 2.

Barton, M., "Amazon, Eucalyptus Team on Hybrid Cloud," on Mar. 22, 2012, Accessed at http://web.archive.org/web/20121122020729/http://www.wired.com/insights/2012/03/amazon-eucalyptus/, Accessed on Jul. 8, 2014, pp. 2.

Bittman, T. J., "Mind the Gap: Here Comes Hybrid Cloud," posted on Sep. 24, 2012, Accessed at http://web.archive.org/web/20131109084849/http://blogs.gartner.com/thomas_bittman/2012/09/24/mind-the-gap-here-comes-hybrid-cloud/, Accessed on Jul. 9, 2014, pp. 11.

Darrow, B. "AppFog lets you pick your cloud, (almost) any cloud," on Jul. 25, 2012, Accessed at http://web.archive.org/web/20130818141753/http://gigaom.com/2012/07/25/appfog-lets-you-pick-your-cloud-almost-any-cloud/, Accessed on Jul. 8, 2014, pp. 6.

Dinda, P. A. and Xia, L., "A Case for Tracking and Exploiting Inter-node and Intra-node Memory Content Sharing in Virtualized Large-Scale Parallel Systems," Proceedings of the 6th international workshop on Virtualization Technologies in Distributed Computing Date, 2012, pp. 11-18.

Hernandez, P., "Piston Builds Airframe for OpenStack Private Clouds," on Aug. 22, 2012, Accessed at http://web.archive.org/web/20130517060500/http://www.datamation.com/cloud-computing/piston-builds-airframe-for-openstack-private-clouds.html, Accessed on Jul. 9, 2014, pp. 2.

International Search Report in International Patent Application No. PCT/US2013/72633 mailed May 15, 2014, 17 pages.

Kim, S. et al., "Group-Based Memory Deduplication for Virtualized Clouds?," Euro-Par'11 Proceedings of the 2011 international conference on Parallel Processing, 2011, pp. 387-397, vol. 2.

Krause, R., "VMware to Join Cloud Initiative Led by Rackspace," posted on Aug. 27, 2012, Accessed at http://news.investors.com/technology/082712-623584-vmware-joins-cloud-openstack-boosting-rackspace.htm, Accessed on Jul. 8, 2014, pp. 3.

Nielsen, M., "Why Bloom filters work the way they do," post on Sep. 26, 2012, Accessed at http://web.archive.org/web/20130925093707/http://www.michaelnielsen.org/ddi/why-bloom-filters-work-the-way-they-do/?, Accessed on Jul. 9, 2014, pp. 12.

Rubin, E., "Cloud Federation and the Intercloud," on Jan. 25, 2010, Accessed at http://web.archive.org/web/20110823154219/http://cloudcomputing.sys-con.com/node/1249746, Accessed on Jul. 8, 2014, pp. 7.

Suzaki, K. et al., "Memory Deduplication as a Threat to the Guest OS," In Proceedings of the Fourth European Workshop on System Security, EUROSEC '11 Proceedings of the Fourth European Workshop on System Security, 2011, pp. 6.

Williams, A., "GE Puts $105M Into Pivotal, the New EMC and VMware Platform Initiative, But Here's What It Is Missing," posted on Apr. 24, 2013, Accessed at http://web.archive.org/web/20131201064909/http://techcrunch.com/2013/04/24/ge-puts-105m-into-pivotal-labs-the-new-emc-and-vmware-platform-initiative-but-heres-what-is-missing/, Accessed on Jul. 9, 2014, pp. 11.

Wood, T. et al., "Memory Buddies: Exploiting Page Sharing for Smart Colocation in Virtualized Data Centers," In Proceedings of the 2009 ACM SIGPLAN/SIGOPS International Conference on Virtual Execution Environments, 2009, pp. 31-40.

* cited by examiner

COMPUTING RESOURCE PROVISIONING BASED ON DEDUPLICATION

CROSS REFERENCE TO RELATED APPLICATION

This application is a U.S. National Stage filing under 35 U.S.C. §371 of International Application No. PCT/US13/72633 filed on Dec. 2, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

In a cloud computing environment, a number of different computing devices may be configured to communicate with one another over a network. Computing devices may be configured to share the computing workload of a particular task or application. Customers may enter into one or more service level agreements with a cloud computing provider. For example, a cloud computing provider may agree to provide a customer with a particular throughput and/or an acceptable mean time between failures. Service level agreements may guarantee a certain level of computing performance. A service level agreement may include guarantees of a quality, speed or duration of service and may be negotiated between a user of the cloud and the owner/provider of the cloud.

SUMMARY

In an example, methods for producing a resource cost are generally described. The resource cost may relate to execution of a first virtual machine at a data center. The methods may include receiving, by a processor, a first representation related to an image of the first virtual machine. The methods may also include receiving, by the processor, a second representation related to one or more instances of second virtual machines being executed by the data center. The methods may also include comparing, by the processor, the first and second representations to produce a deduplication value for the first virtual machine. The methods may also include transforming, by the processor, the deduplication value to produce the resource cost.

In an example, an estimator module effective to produce a resource cost is generally described. The resource cost may relate to execution of a first virtual machine at a data center. The estimator module may include a processor and a memory configured to be in communication with the processor. The memory may be effective to store instructions executable by the processor. The processor may be effective to, based on the instructions, receive a first representation related to an image of the first virtual machine. The processor may be also effective to, based on the instructions, receive a second representation related to one or more instances of second virtual machines being executed by the data center. The processor may be also effective to, based on the instructions, compare the first and second representations to produce a deduplication value for the first virtual machine. The processor may be also effective to, based on the instructions, determine available computing resources of the data center. The processor may also be effective to, based on the instructions and the available computing resources, transform the deduplication value to produce the resource cost. The processor may also be effective to store the resource cost in the memory, based on the instructions.

In an example, systems effective to produce a first and a second resource cost are generally described. The first and the second resource costs may relate to execution of a first virtual machine at a data center. The systems may include a processor and a memory configured to be in communication with the processor. The memory may be effective to store instructions executable by the processor. The processor may be effective to, based on the instructions, receive a first representation related to an image of the first virtual machine. The processor may also be effective to, based on the instructions, receive a second representation related to a first instance of a second virtual machine being executed by the data center. The processor may also be effective to, based on the instructions, receive a third representation related to a second instance of a third virtual machine being executed by the data center. The processor may also be effective to, based on the instructions, compare the first representation to the second representation to produce a first deduplication value for the first virtual machine. The processor may also be effective to, based on the instructions, compare the first representation to the third representation to produce a second deduplication value for the first virtual machine. The processor may also be effective to, based on the instructions, transform the first deduplication value to produce a first resource cost. The processor may also be effective to, based on the instructions, transform the second deduplication value to produce a second resource cost. The processor may also be effective to, based on the instructions, store the first and second resource costs in the memory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to computing resource provisioning based on deduplication.

Briefly stated, technologies are generally described for systems, devices and methods effective to provision computing resources based on deduplication. In an example, a resource cost may be produced. The resource cost may relate to execution of a first virtual machine at a data center. A processor may receive a first representation related to an image of the first virtual machine. The processor may receive a second representation related to one or more instances of second virtual machines being executed by the data center. The processor may compare the first and second representations to produce a deduplication value for the first virtual machine. The processor may transform the deduplication value to produce the resource cost.

Figure 1:
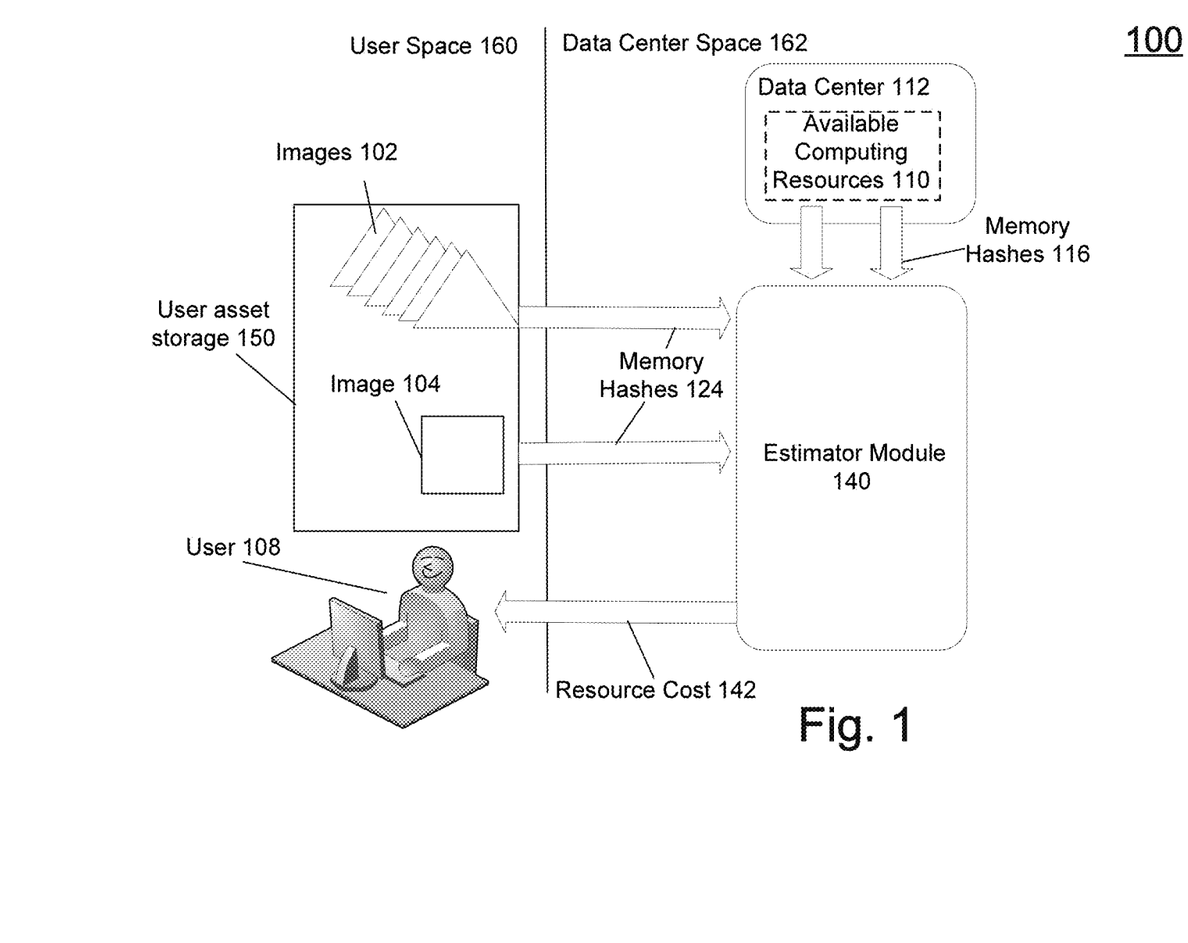
FIG. 1 illustrates an example system that can be utilized to implement computing resource provisioning based on deduplication.

FIG. 1 illustrates an example system 100 that can be utilized to implement computing resource provisioning based on deduplication, arranged in accordance with at least some embodiments described herein. As depicted, example system 100 may include a user space 160 and a data center space 162. User space 160 and data center space 162 may be physically collocated or may be located at different physical locations. Data center space 162 may include a data center 112 and an estimator module 140. User space 160 may include user asset storage 150. User asset storage may include images 102, 104 of instances. User space 160 may further include other hardware associated with a user 108.

An instance may be, for example, an instantiation of a virtual machine or another user specified computing task or application. Images 102 may be related in terms of memory requirements of stored content. For example, each of images 102 may require the same or similar operating systems. Images 102 may be instantiations of two or more virtual machines. In an example, each of images 102 may share similar memory requirements with respect to one another. Conversely, image 104 may include dissimilar memory requirements with respect to images 102—as is highlighted by the use of a triangle for images 102 and a square for image 104. For example, image 104 may require a different operating system than the operating system of or required by images 102. Images 102/104 may be stored in user asset storage 150. User asset storage 150 may be a memory associated with user 108 and/or with one or more computing devices associated with user 108.

Memory hashes 124 may be, for example, associative data structures that may represent an instance. For example, a memory hash may be a sequence of numbers that identifies the contents an instance. Memory hashes 124 may represent memory requirements of an instance, including images 102 and image 104. In an example, a particular memory hash 124 may represent the contents of one page of memory required by images 102, 104. Memory hashes 124 of images 102 and image 104 may be generated by a computing device associated with user 108. Alternatively, data related to images 102 and image 104 may be provided to estimator module 140. Estimator module 140 may use data related to images 102 and image 104 to generate memory hashes 124.

Data center 112 may be one or more computing devices configured to execute instances such as images 102, 104. In an example, data center 112 may include one or more data servers. Data center 112 may provide an indication of available computing resources 110 of data center 112 to estimator module 140. An indication of available computing resources 110 may include, for example, an amount of available memory, an amount of available cache, an amount of processing power, an amount of bandwidth or another computing resource available for use. Data center 112 may also generate and send memory hashes 116 to estimator module 140. Memory hashes 116 may be, for example, associative data structures which represent memory contents of one or more instances currently being executed by data center 112.

As will be discussed in more detail below, estimator module 140 may be configured to receive memory hashes 124 of images 102, 104. Estimator module 140 may be further configured to receive memory hashes of one or more instances of virtual machines being executed by data center 112. Estimator module 140 may be configured to compare memory hashes 124 to the memory hashes of the instances of virtual machines being executed by data center 112 to produce a deduplication value. The deduplication value may relate to a similarity and/or commonality between memory requirements of instances being executed by data center 112 and one or more of images 102 and/or 104. Based on an indication of available computing resources 110 and the deduplication value for a particular one of images 102 and/or 104, estimator module 140 may transform the deduplication value to produce a resource cost 142 to execute the particular image 102 at data center 112.

Resource cost 142 may be, for example, an amount of memory, processing power, bandwidth or other computing resource required by the execution of a particular instance. In another example, resource cost 142 may include a price for the execution of a particular instance by data center 112. Estimator module 140 may provide resource cost 142 to a user 108.

User 108 may be an individual or entity that desires performance of a computing service, such as, for example, execution of one or more virtual machines represented by images 102 and/or 104. In an example, user 108 may wish to execute several images 102, 104 on one or more data centers. In the example, images 102 may require a lesser percentage of available computing resource 110 relative to image 104, as images 102 may have more commonality and achieve a higher deduplication value relative to image 104. Commonality may be expressed by comparing content of an image to content stored in memory associated with available computing resources 110 or expressed by comparing content required by multiple copies of images 102 that the user 108 desires to operate. Resource cost 142 may indicate that image 102 is less expensive to execute on data center 112 than image 104. In response to instructions from user 108, estimator module 140 may instruct data center 112 to execute a virtual machine based on resource cost 142.

Figure 2:
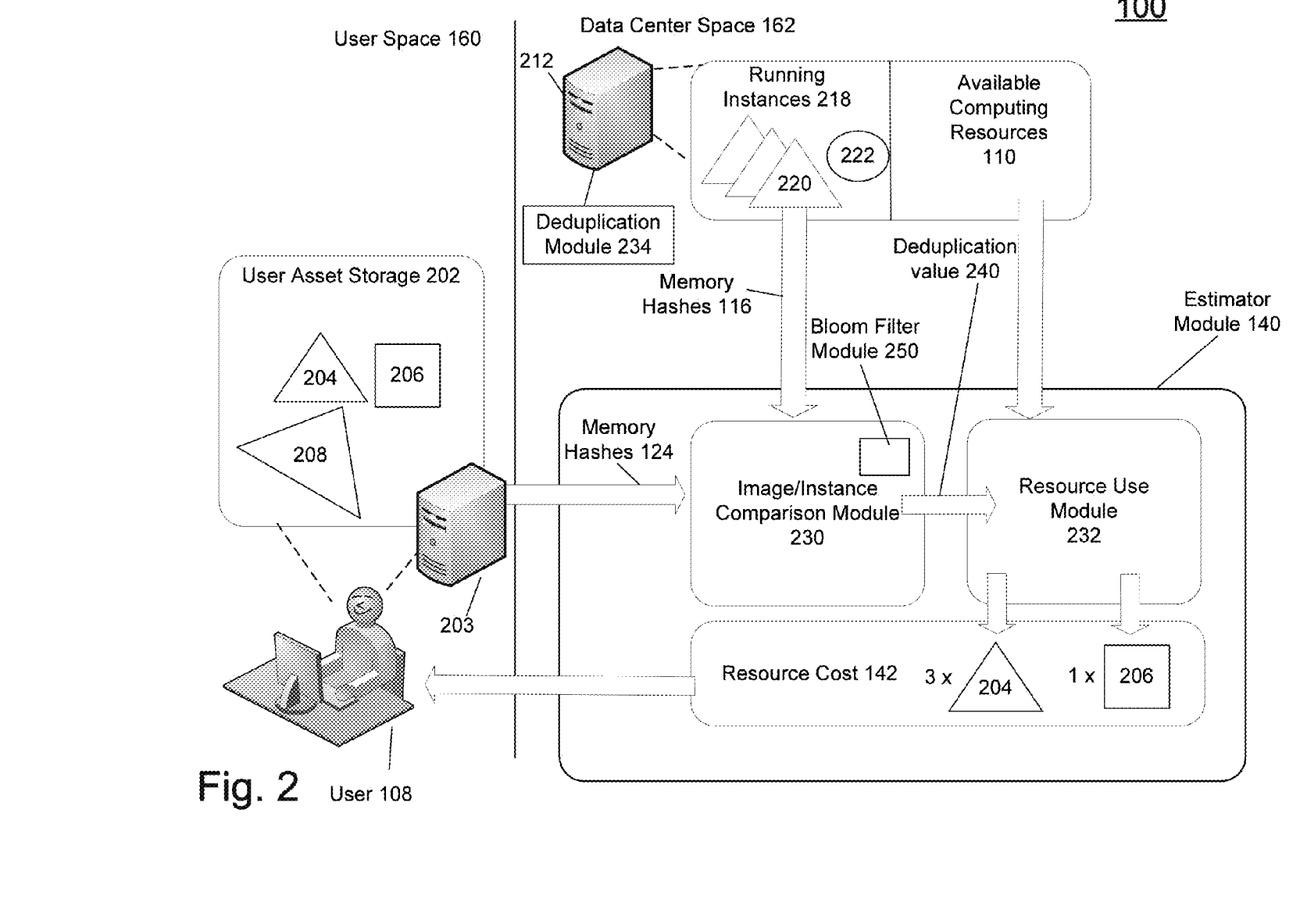
FIG. 2 depicts the example system of FIG. 1 with further detail relating to an estimator module.

FIG. 2 depicts system 100 of FIG. 1, with further detail relating to estimator module 140, arranged according to at least some embodiments described herein. Those components in FIG. 2 that are labeled identically to components of FIG. 1 will not be described again for the purposes of clarity and brevity.

Estimator module 140 may include an image/instance comparison module 230 and a resource use module 232. In an example, user 108 may desire to have data center 212 execute one or more applications and/or virtual machines. User 108 may store images of such virtual machine instances and/or applications in a user asset storage 202. User asset storage 202 may be a memory associated with user 108 and may be physically located with user 108 or datacenter 112 or at another place in communication with user 108 or datacenter 112. In an example, user asset storage 202 may store images 204, 206 and 208 of one or more virtual machines.

User 108 may want to determine the relative resource cost for data center 212 to decide whether to execute one or more of images 204, 206 and/or 208. User 108 may instruct processor 203 to generate and provide memory hashes 124 representing one or more of images 204, 206 and/or 208 to image/instance comparison module 230 of estimator module 140. Image/instance comparison module 230 may be configured to determine a deduplication value 240 based on images 204, 206, and/or 208 and running instances 218. Deduplication value 240 may be an indication of an amount of common resources requirements shared by two or more instances and/or images.

Data center 212 may represent one or more data servers of a cloud-computing provider. Data center 212 may include a deduplication module 234. Deduplication module 234 may be hardware or a combination of hardware and instructions executable on the hardware. Deduplication module 234 may be configured to deduplicate memory and/or other computing resources required by instances being executed by data center 212.

Data center 212 may be executing one or more running instances 218. Running instances 218 may be virtual machines or other applications. In an example, running instances 218 may include instance 220 and instance 222. Data center 212 may include available computing resources 110 available to be used to execute other instances. Data center 212 may send an indication of available computing resources 110 to estimator module 140. In some examples, an indication of available computing resources 110 may include an amount of memory available, an amount of cache available, an amount of processing power available, and/or an amount of bandwidth available or some combination thereof. An indication of available computing resources 110 may also include other information about data center 212 such as operating system information and other hardware and/or software specifications.

Data center 212 may provide memory hashes 116 to image/instance comparison module 230 of estimator module 140. Image/instance comparison module 230 may be hardware or a combination of hardware and instructions executable on the hardware. Memory hashes 116 may represent memory requirements of one or more running instances 218. For images stored in user asset storage 202 (including images 204, 206 and/or 208), image/instance comparison module 230 may be configured to compare memory hashes 124 with memory hashes 116. In an example, image/instance comparison module 230 may compare memory hashes 124 and memory hashes 116 directly to produce deduplication value 240. In another example, bloom filter module 250 of image/instance comparison module 230 may convert memory hashes 116, 124 into one or more bloom filters. Image/instance comparison module 230 may be configured to compare the bloom filters to produce deduplication value 240. Deduplication value 240 may be sent to resource use module 232.

Resource use module 232 may be hardware or a combination of hardware and instructions executable on the hardware. Resource use module 232 may receive deduplication value 240. Resource use module 232 may receive the indication of available computing resources 110 from data center 212. Resource use module 232 may transform deduplication value 240 to produce resource cost 142. In an example, deduplication value 240 may be transformed to produce resource cost 142 based on the indication of available computing resources 110. Resource cost 142 may be sent to user 108.

Resource cost 142 may include a cost number, value or price. Resource cost 142 may indicate respective numbers of different instances that may be executed for the same price or costs based on an indication of available computing resources 110. In the example shown, resource cost 142 may indicate that three instances of image 204 may be executed by data center 212 or one instance of image 206 may be executed for the same price or cost as image 204 may deduplicate more efficiently with running instances 218 as compared to image 206. User 108 may determine whether or not to execute images stored in user asset storage 202 on data center 212 based on resource cost 142. In an example, estimator module 140 may be configured to provision available computing resources 110 and instruct data center 212 to execute a virtual machine based on resource cost 142.

In another example, resource cost 142 may include a price to execute a particular instance. For example, a first image may have a first resource cost. A second image may have a second resource cost. The second resource cost may be lower than the first resource cost. In the example, resource cost 142 may include a price to execute the first image and/or the second image in data center 212. The price for the first image may be lower relative to the price for the second image as the first image may have a higher deduplication value relative to the second image. Estimator module 140 may generate a recommendation for user 108 to execute the first image based on the resource costs.

Figure 3:
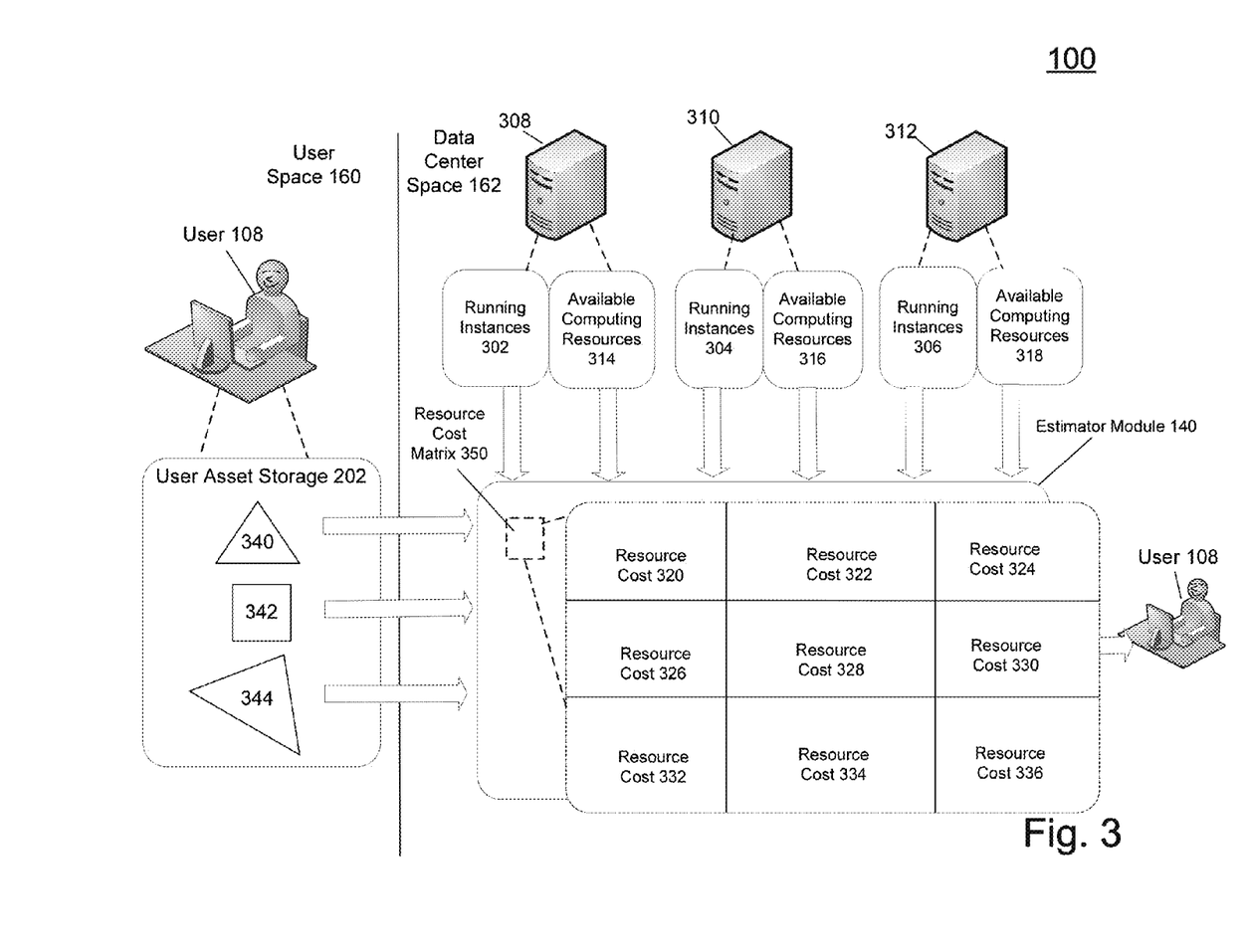
FIG. 3 depicts the example system of FIG. 1 further illustrating an example where multiple resource costs are generated.

FIG. 3 depicts system 100 of FIG. 1 further illustrating an example where multiple resource costs are generated, arranged according to at least some embodiments described herein. Those components in FIG. 3 that are labeled identically to components of FIGS. 1 and 2 will not be described again for the purposes of clarity and brevity.

In an example, system 100 may include data servers 308, 310 and 312 configured to be in communication with estimator module 140. Data server 308 may include one or more running instances 302. Running instances 302 may be instances currently being executed by data server 308. Data server 308 may include available computing resources 314. Data server 310 may include one or more running instances 304 and available computing resources 316. Data server 312 may include one or more running instances 306 and available computing resources 318.

User 108 may desire to have one or more data centers execute one or more applications and/or virtual machines. User 108 may store images of such virtual machine instances and/or applications in user asset storage 202. User asset storage 202 may be a memory associated with user 108. In an example, user asset storage 202 may store images 340, 342 and/or 344. Images 340, 342 and/or 344 may represent instances of one or more virtual machines.

User 108 may want to determine the resource costs for each of data servers 308, 310 and/or 312 to decide whether to execute one or more of images 340, 342 and/or 344. In an example, estimator module 140 may compare images 340, 342 and/or 344 with running instances 302, 304, 306 and indications of available computing resources 314, 316, 318 for data servers 308, 310 and/or 312 to produce a resource cost matrix 350. For example, estimator module 140 may compare image 340 with running instances 302 to produce a deduplication value. Based on an indication of available computing resources 314 and the deduplication value, estimator module 140 may produce resource cost 320. A similar procedure may be applied for data servers 310, 312 and images 342 and 344 to produce resource costs 322, 324, 326, 328, 330, 332, 334 and/or 336. Resource cost matrix 350 may be sent to user 108 partially or entirely. In some embodiments, only "best" options, such as those with the lowest cost, of resource cost matrix 350 may be provided to user 108. User 108 may select a data server for execution of one or more of images 340, 342 and/or 344 based on resource costs in resource cost matrix 350. In an example, estimator module 140 may recommend a particular data server 308, 310 or 312 to execute a particular image based upon resource costs in resource cost matrix 350. In another example, estimator module 140 may be configured to provision available computing resources 314, 316 and/or 318 of data servers 308, 310 and/or 312 based on respective resource costs by instructing the applicable data server to execute the particular instance.

Among other possible benefits, a system in accordance with the disclosure may optimize resource use or price for execution of candidate virtual machine images at a data center. Lower resource cost and/or price may incentivize efficient data center usage which may, in turn, benefit overall data center efficiency. For example, a highly deduplicated instance may be cheaper in terms of resource cost and/or price and may launch more quickly and/or perform more efficiently relative to a non-deduplicated instance on the same data center. Accordingly, a user may choose to execute a particular image on a particular data center based on a degree of deduplication. A user may choose to execute instances in a different order based on resource costs. Users may be incentivized to maintain multiple versions of images or applications that may perform the same task and then request execution of a select one of the images based on resource costs. A cloud broker may be used to maintain multiple versions of images or applications to facilitate a user selecting an image with a higher deduplication value. Migration speed may be reduced. Servers with multiple cores may be implemented with less memory capacity because memory use efficiency may be increased from deduplication.

A system in accordance with the disclosure may also reduce network traffic. For example, an instance may share the same operating system as a neighboring instance. In the example, instead of transporting operating system files from a remote location, the instance may reference the neighboring instance for access to the files, effectively reducing network traffic. Additionally, a system in accordance with the disclosure may include security benefits. For example, in a system with small scale deduplication, collocation techniques may be used to locate a target system for a potentially malicious attack. However, if many processes throughout a data center share deduplication content, detecting collocation will be less of a security threat as identical instances may be in deduplicated instances, effectively reducing the risk of a successful collocation attack.

Figure 4:
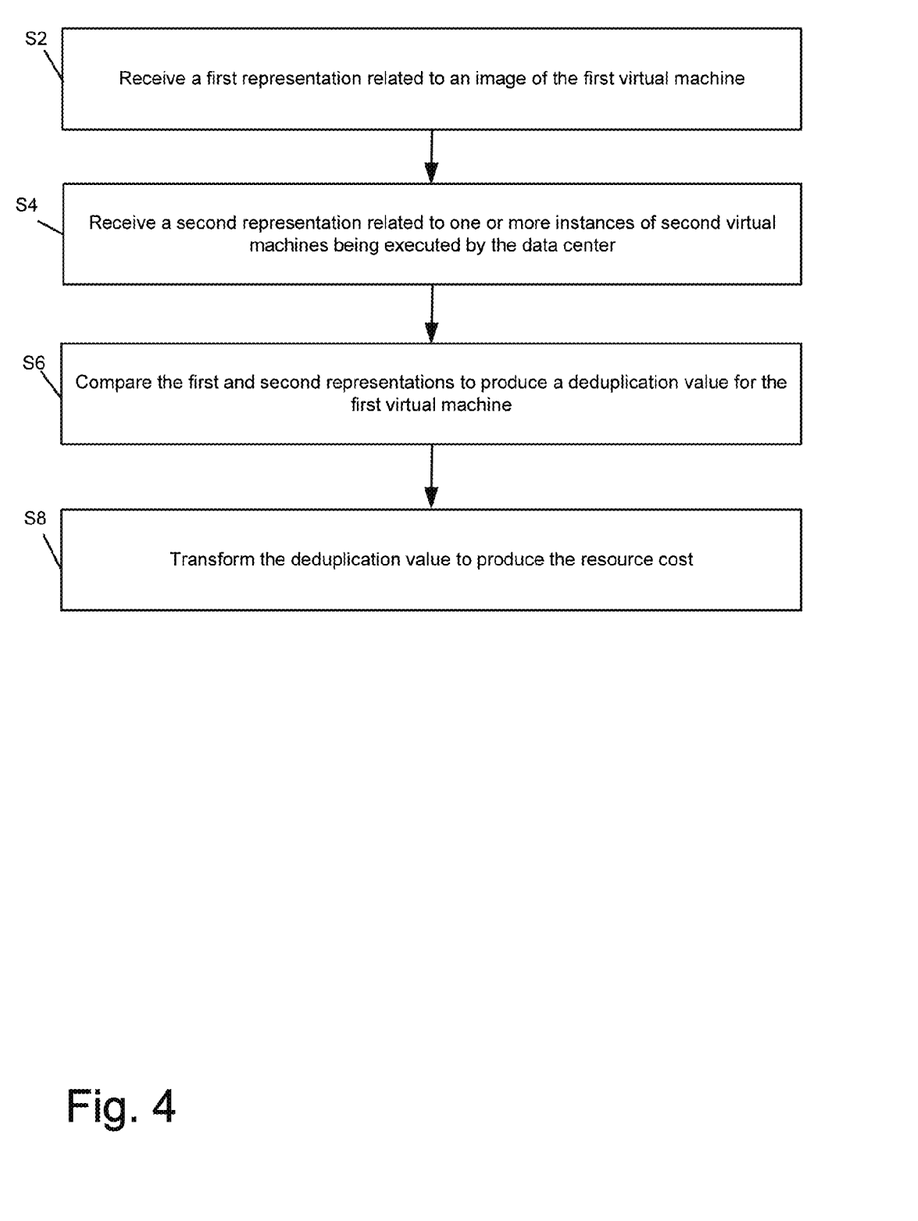
FIG. 4 depicts a flow diagram for an example process for implementing computing resource provisioning based on deduplication.

FIG. 4 depicts a flow diagram for an example process for implementing computing resource provisioning based on deduplication, arranged in accordance with at least some embodiments described herein. In some examples, the process in FIG. 4 could be implemented using system 100 discussed above and could be used to provision computing resources based on deduplication. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. The process in FIG. 4 may be used by an estimator module. The estimator module may be configured in communication with one or more users and one or more data centers.

Processing may begin at block S2, "Receive a first representation related to an image of the first virtual machine." At block S2, the estimator module may receive a first representation related to an image of the first virtual machine. The first representation may comprise a first hash of the image. The first hash may be converted into a bloom filter.

Processing may continue from block S2 to block S4, "Receive a second representation related to one or more instances of second virtual machines being executed by the data center." At block S4, the estimator module may receive a second representation related to one or more instances of second virtual machines being executed by the data center. The second representation may comprise a second hash of the one or more instances of second virtual machines.

Processing may continue from block S4 to block S6, "Compare the first and second representations to produce a deduplication value for the first virtual machine." At block S6, the estimator module may compare the first and second representations to produce a deduplication value for the first virtual machine. Comparing the first and second representations may include comparing the first bloom filter and the second hash.

Processing may continue from block S6 to block S8, "Transform the deduplication value to produce the resource cost." At block S8, the estimator module may be configured to transform the deduplication value to produce the resource cost. The estimator module may be further configured to instruct the data center to execute the first virtual machine based on the resource cost. The estimator module may be further configured to transform the deduplication value based on an indication of available computing resources at the data center.

Figure 5:
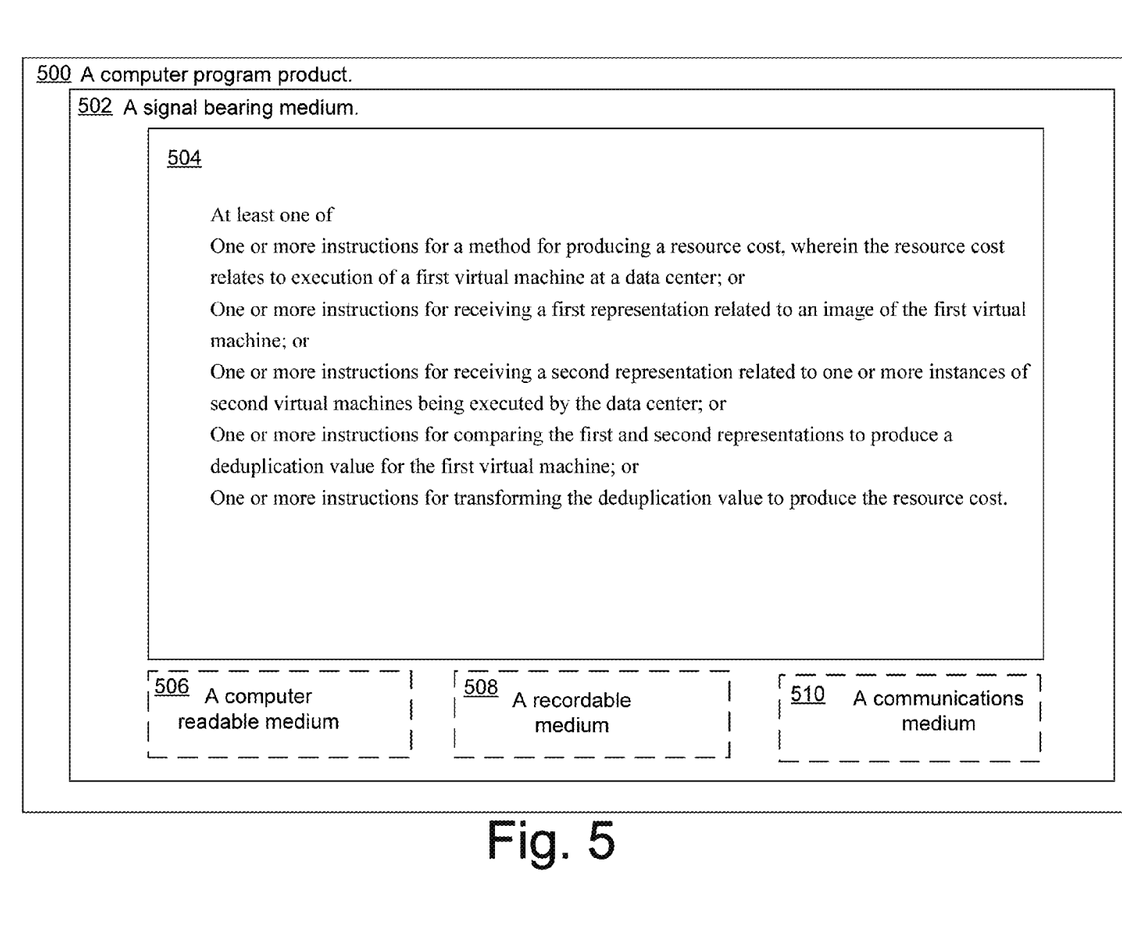
FIG. 5 illustrates an example computer program product that can be utilized to implement computing resource provisioning based on deduplication.

FIG. 5 illustrates an example computer program product 500 that can be utilized to implement computing resource provisioning based on deduplication arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, estimator module 140 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive (HDD), a compact disc (CD), a digital video disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communication medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the system 100 by an RF signal bearing medium 502, where the signal bearing medium 502 is conveyed by a wireless communication medium 510 (e.g., a wireless communication medium conforming with the IEEE 802.11 standard).

Figure 6:
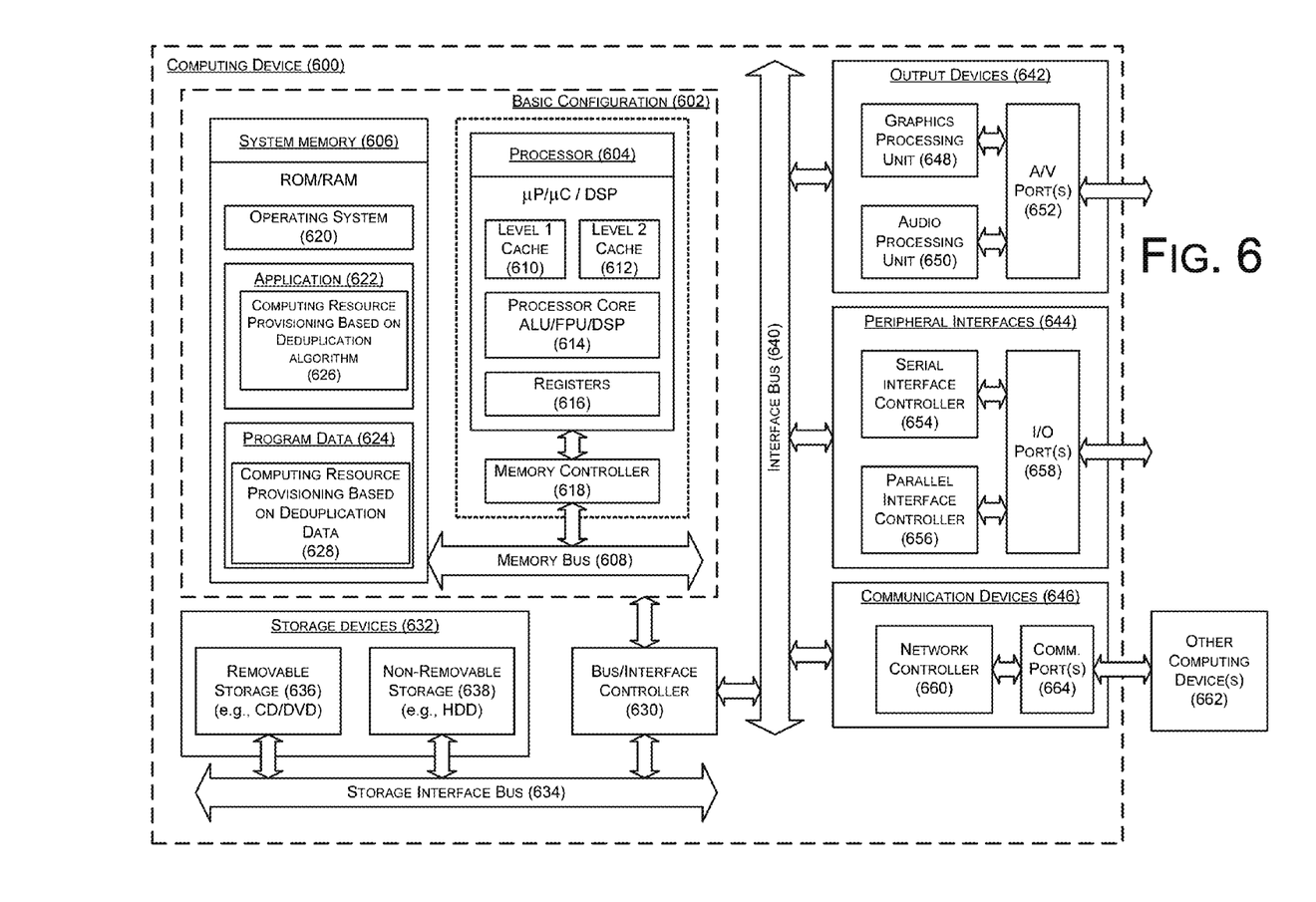
FIG. 6 is a block diagram illustrating an example computing device that is arranged to implement computing

FIG. 6 is a block diagram illustrating an example computing device 600 that is arranged to implement computing resource provisioning based on deduplication arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622 and program data 624. Application 622 may include a computing resource provisioning based on deduplication algorithm 626 that is arranged to perform the functions as described herein including those described with respect to system 100 of FIGS. 1-5. Program data 624 may include computing resource provisioning based on deduplication data 628 that may be useful to implement computing resource provisioning based on deduplication as is described herein. In some embodiments, application 622 may be arranged to operate with program data 624 on operating system 620 such that computing resource provisioning based on deduplication may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to produce a resource cost, wherein the resource cost relates to execution of a first virtual machine at a data center, the method comprising:
    receiving, by an estimator, a first representation that represents contents of an image of the first virtual machine, wherein the contents of the image of the first virtual machine are stored in a memory associated with the first virtual machine;
    receiving, by the estimator, a second representation that represents contents of an instance of a second virtual machine currently being executed by the data center;
    identifying, by the estimator, an amount of common resource requirements shared between the contents of the image represented by the first representation and the contents of the instance represented by the second representation;
    producing, based on the identified common resource requirements, a deduplication value for the first virtual machine, wherein the deduplication value is produced by comparison between the contents of the image represented by the first representation and the contents of the instance represented by the second representation, and wherein the deduplication value indicates a degree of deduplication associated with the common resource requirements at the data center;
    transforming, by the estimator, the deduplication value to produce the resource cost by evaluation of the degree of deduplication indicated by the deduplication value, wherein the evaluation of the degree of deduplication includes a use of the deduplication value to determine a number of contents of the image of the first virtual machine that are executable for a same cost as that of the instance of the second virtual machine currently being executed by the data center, and wherein the number of contents is indicated by the resource cost;

generating, by the estimator, a recommendation based on the number of contents of the image of the first virtual machine that are executable at the data center, wherein the recommendation includes indications of one or more resource costs that include the produced resource cost; and executing, by the estimator, the first virtual machine at the data center based on the generated recommendation, wherein the execution of the first virtual machine at the data center is performed by referencing to the contents of the image of the first virtual machine, and wherein referencing to the contents of the image of the first virtual machine facilitates a reduction in network traffic related to transportation of the contents of the image of the first virtual machine from the memory, associated with the first virtual machine, to the data center.

2. The method of claim 1, further comprising instructing, by the estimator, the data center to execute the first virtual machine based on the one or more resource costs that include the produced resource cost.

3. The method of claim 1, wherein receiving the first representation comprises receiving a first hash of the image of the first virtual machine, and wherein receiving the second representation comprises receiving a second hash of the instance of the second virtual machine.

4. The method of claim 3, further comprising:
converting, by the estimator, the first hash into a first bloom filter; and
converting, by the estimator, the second hash into a second bloom filter,
wherein comparison between the first representation and the second representation comprises comparison between the first bloom filter and the second bloom filter.

5. The method of claim 1, further comprising receiving, by the estimator, an indication of available computing resources of the data center,
wherein transforming the deduplication value is based on the indication of the available computing resources.

6. The method of claim 1, wherein the instance of the second virtual machine includes a first instance, and wherein the method further comprises:
receiving, by the estimator, after the transformation, a third representation that represents contents of a second instance of a third virtual machine under execution by the data center;
comparing, by the estimator, the first representation with the third representation to produce a different deduplication value for the first virtual machine; and
transforming, by the estimator, the different deduplication value to produce a different resource cost to execute the first virtual machine at the data center.

7. The method of claim 6, further comprising instructing, by the estimator, the data center to execute the first virtual machine at the data center based on the resource cost and the different resource cost.

8. The method of claim 1, wherein the image of the first virtual machine includes a first image, and wherein the method further comprise:
receiving, by the estimator, a third representation that represents contents of a second image of a third virtual machine;

comparing, by the estimator, the second representation with the third representation to produce a different deduplication value for the third virtual machine;
transforming, by the estimator, the different deduplication value to produce a different resource cost to execute the third virtual machine at the data center; and
generating, by the estimator, a recommendation to execute the first virtual machine or the third virtual machine based on the resource cost and the different resource cost.

9. The method of claim 8, further comprising:
receiving, by the estimator, an indication of available computing resources of the data center; and
generating, by the estimator, an indication that a first number of instances of the first virtual machine are executable based on the available computing resources and the resource cost, and a second number of instances of the third virtual machine are executable based on the available computing resources and the different resource cost.

10. An estimator module effective to produce a resource cost, wherein the resource cost relates to execution of a first virtual machine at a data center, the estimator module comprising:
a processor; and
a system memory configured to be in communication with the processor,
wherein the system memory is effective to store instructions executable by the processor, and
wherein the processor is effective to execute the instructions to:
identify a first representation that represents contents of an image of the first virtual machine, wherein the contents of the image of the first virtual machine are stored in a memory associated with the first virtual machine;
identify a second representation that represents contents of an instance of a second virtual machine currently being executed by the data center;
identify an amount of common resource requirements shared between the contents of the image represented by the first representation and the contents of the instance represented by the second representation;
produce, based on the identified common resource requirements, a deduplication value for the first virtual machine, wherein the deduplication value is produced by comparison between the contents of the image represented by the first representation and the contents of the instance represented by the second representation, and wherein the deduplication value indicates a degree of deduplication associated with execution of the common resource requirements at the data center;
determine available computing resources of the data center;
transform the deduplication value to produce the resource cost based on the available computing resources and based on an evaluation of the degree of deduplication indicated by the deduplication value, wherein the evaluation of the degree of deduplication includes use of the deduplication value to determine a number of contents of the image of the first virtual machine that are executable for a same cost as that of the instance of the second virtual machine currently being executed by the data center, and wherein the number of contents is indicated by the resource cost;
store the resource cost in the system memory;

generate a recommendation based on the resource cost, wherein the recommendation relates to the execution of the first virtual machine at the data center, and wherein the recommendation includes indications of one or more resource costs that include the produced resource cost; and execute the first virtual machine at the data center based on the generated recommendation, wherein the execution of the first virtual machine at the data center is performed by reference to the contents of the image of the first virtual machine, and wherein the reference to the contents of the image of the first virtual machine facilitates a reduction in network traffic related to transportation of the contents of the image of the first virtual machine from the memory, associated with the first virtual machine, to the data center.

11. The estimator module of claim 10, wherein the processor is effective to generate an instruction to execute the first virtual machine at the data center based on the one or more resource costs that include the produced resource cost.

12. The estimator module of claim 10, wherein the first representation comprises a first hash of the image of the first virtual machine, and wherein the second representation comprises a second hash of the instance of the second virtual machine.

13. The estimator module of claim 12, wherein the processor is further effective to:
 convert the first hash into a first bloom filter;
 convert the second hash into a second bloom filter; and
 compare the first bloom filter with the second bloom filter.

14. The estimator module of claim 10, wherein the instance of the second virtual machine includes a first instance, and wherein the processor is further effective to:
 receive, after the deduplication value is transformed, a third representation that represents contents of a second instance of a third virtual machine currently being executed by the data center;
 compare the first representation with the third representation to produce a different deduplication value for the first virtual machine; and
 transform the different deduplication value to produce a different resource cost to execute the first virtual machine at the data center.

15. The estimator module of claim 14, wherein the processor is effective to generate an instruction to execute the first virtual machine at the data center based on the resource cost and the different resource cost.

16. A system effective to produce a first resource cost and a second resource cost, wherein the first resource cost and the second resource cost relate to execution of a first virtual machine at a data center, the system comprising:
 a processor; and
 a system memory configured to be in communication with the processor,
 wherein the system memory is effective to store instructions executable by the processor, and
 wherein the processor is effective to execute the instructions to:
  identify a first representation that represents contents of an image of the first virtual machine, wherein the contents of the image of the first virtual machine are stored in a memory associated with the first virtual machine;
  identify a second representation that represents contents of a first instance of a second virtual machine currently being executed by the data center;
  identify a third representation that represents contents of a second instance of a third virtual machine currently being executed by the data center;
  identify a first amount of common resource requirements shared between the contents of the image represented by the first representation and the contents of the first instance represented by the second representation;
  identify a second amount of common resource requirements shared between the contents of the image represented by the first representation and the contents of the second instance represented by the third representation;
  compare the contents of the image represented by the first representation with the contents of the first instance represented by the second representation to produce a first deduplication value for the first virtual machine, wherein the first deduplication value indicates a first degree of deduplication associated with execution of the first common resource requirements at the data center;
  compare the contents of the image represented by the first representation with the contents of the second instance represented by the third representation to produce a second deduplication value for the first virtual machine, wherein the second deduplication value indicates a second degree of deduplication associated with execution of the second common resource requirements at the data center;
  transform the first deduplication value to produce a first resource cost based on an evaluation of the first degree of deduplication indicated by the first deduplication value, wherein the evaluation of the first degree of deduplication includes use of the first deduplication value to determine a first number of contents of the image of the first virtual machine that are executable for a same cost as that of the instance of the second virtual machine currently being executed by the data center, and wherein the first number of contents is indicated by the first resource cost;
  transform the second deduplication value to produce a second resource cost based on an evaluation of the second degree of deduplication indicated by the second deduplication value, wherein the evaluation of the second degree of deduplication includes use of the second deduplication value to determine a second number of contents of the image of the first virtual machine that are executable for a same cost as that of the instance of the third virtual machine currently being executed by the data center, and wherein the second number of contents is indicated by the second resource cost;
  store the first resource cost and the second resource cost in the system memory;
  generate a recommendation based on the first resource cost and the second resource cost, wherein the recommendation relates to the execution of the first virtual machine at the data center, and wherein the recommendation includes indications of one or more resource costs that include the produced first resource cost and the produced second resource cost; and
  execute the first virtual machine at the data center based on the generated recommendation, wherein the execution of the first virtual machine at the data center is performed by reference to the contents of the image of the first virtual machine, and wherein the reference to the contents of the image of the first virtual machine facilitates a reduction in network traffic related to transportation of the contents of the image of the first virtual machine from the memory, associated with the first virtual machine, to the data center.

17. The system of claim 16, wherein the image of the first virtual machine includes a first image, and wherein the processor is further effective to:
   identify a fourth representation that represents contents of a second image of a fourth virtual machine;
   compare the fourth representation with the second representation to produce a first different deduplication value for the fourth virtual machine;
   compare the fourth representation with the third representation to produce a second different deduplication value for the fourth virtual machine;
   transform the first different deduplication value to produce a first different resource cost;
   transform the second different deduplication value to produce a second different resource cost; and
   store the first different resource cost and the second different resource cost in the system memory.

18. The system of claim 17, wherein the processor is further effective to generate a resource cost matrix based on the first resource cost, the second resource cost, the first different resource cost, and the second different resource cost.

19. The system of claim 16, wherein the processor is effective to instruct the data center to execute the first virtual machine based on the first resource cost and the second resource cost.

20. The system of claim 16, wherein:
   the first representation comprises a first hash of the image of the first virtual machine,
   the second representation comprises a second hash of the first instance of the second virtual machine, and
   the third representation comprises a third hash of the second instance of the third virtual machine.

* * * * *